United States Patent
Ochs et al.

(10) Patent No.: US 11,952,302 B2
(45) Date of Patent: *Apr. 9, 2024

(54) PROCESS FOR THE PREPARATION OF FLUORINATED QUARTZ GLASS

(71) Applicant: Heraeus Quarzglas GmbH & Co. KG, Hanau (DE)

(72) Inventors: Stefan Ochs, Hanau (DE); Thomas Kayser, Hanau (DE); Martin Trommer, Hanau (DE); Andreas Langner, Hanau (DE); Sascha Pihan, Hanau (DE); Kay Schuster, Hanau (DE); Michael Hünermann, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 173 days.

This patent is subject to a terminal disclaimer.

(21) Appl. No.: 17/395,791

(22) Filed: Aug. 6, 2021

(65) Prior Publication Data
US 2022/0041488 A1 Feb. 10, 2022

(30) Foreign Application Priority Data

Aug. 6, 2020 (EP) .................... 20189825

(51) Int. Cl.
 *C03B 19/14*    (2006.01)
 *C03C 3/06*     (2006.01)
(52) U.S. Cl.
 CPC ........ *C03B 19/143* (2013.01); *C03B 19/1423* (2013.01); *C03B 19/1453* (2013.01);
(Continued)

(58) Field of Classification Search
 CPC ... C03B 37/014; C03B 19/14; C03B 2201/12; C03B 2207/85; C03B 2207/86;
(Continued)

(56) References Cited

U.S. PATENT DOCUMENTS 4,378,987 A * 4/1983 Miller ................... C03B 37/014
                      65/421
4,501,602 A * 2/1985 Miller ..................... C07C 45/77
                      65/390

(Continued)

FOREIGN PATENT DOCUMENTS

DE   10054270 A1 * 5/2002 ......... C03B 19/1415
EP    0058571 A1 * 8/1982 ....... C03B 37/01413
(Continued)

OTHER PUBLICATIONS

Belohlav and McBee, "Halogenation", (Sep. 1959), Journal of Industrial and Engineering Chemistry, vol. 51, No. 9, Part II, p. 1102-1110, (Year: 1959).*

(Continued)

*Primary Examiner* — Galen H Hauth
*Assistant Examiner* — Steven S Lee
(74) *Attorney, Agent, or Firm* — Dicke, Billig & Czaja, PLLC

(57) ABSTRACT

A process for the production of a fluorinated quartz glass including the steps of generating $SiO_2$ particles in a synthesis burner; depositing the resulting $SiO_2$ particles into a body; and vitrifying the resulting body, wherein a fluorinating agent having a boiling point greater than or equal to −10° C. is supplied to the synthesis burner.

8 Claims, 1 Drawing Sheet

(52) U.S. Cl.
CPC ............ *C03C 3/06* (2013.01); *C03B 2201/12* (2013.01); *C03B 2207/30* (2013.01); *C03C 2201/12* (2013.01); *C03C 2203/40* (2013.01)

(58) Field of Classification Search
CPC . C03B 2207/30; C03B 2207/34; C03B 37/00; C03B 19/01; C03B 2201/01; C03B 2207/08; C03B 2207/03
See application file for complete search history.

(56) References Cited

U.S. PATENT DOCUMENTS

| | | | | |
|---|---|---|---|---|
| 4,604,118 A * | 8/1986 | Bocko | ................ | C03B 37/0142 427/253 |
| 4,645,524 A * | 2/1987 | Bocko | ................... | C04B 35/64 65/17.5 |
| 4,718,929 A * | 1/1988 | Power | ................... | C03C 13/041 423/489 |
| 5,071,460 A * | 12/1991 | Fujiura | ............... | C03B 19/1476 65/413 |
| 5,145,508 A * | 9/1992 | Fujiura | ............. | C03B 37/01861 65/413 |
| 5,891,531 A * | 4/1999 | Konishi | .................. | C03C 17/02 427/575 |
| 6,546,757 B1 * | 4/2003 | Morse | ............... | C03B 37/01892 65/421 |
| 6,564,587 B2 * | 5/2003 | Artiouchenko | ........ | B82Y 20/00 264/1.24 |
| 6,910,352 B2 * | 6/2005 | Johnson | ............. | C03B 37/0142 65/413 |
| 6,944,380 B1 | 9/2005 | Hideo | ................ | C03C 25/1065 427/163.1 |
| 8,865,271 B2 * | 10/2014 | Bi | ...................... | C03B 37/0142 427/569 |
| 9,416,044 B2 * | 8/2016 | Trommer | ............. | C03B 37/027 |
| 2002/0162357 A1 * | 11/2002 | Tennent | ............ | C03B 37/01413 65/17.4 |
| 2003/0118841 A1 * | 6/2003 | Horne | .................... | B82Y 30/00 428/425.9 |
| 2003/0221459 A1 * | 12/2003 | Walczak | ............. | C03B 37/0146 65/398 |
| 2005/0019504 A1 * | 1/2005 | Bi | .......................... | C23C 16/56 427/596 |
| 2006/0179879 A1 * | 8/2006 | Ellison | ..................... | C03C 3/06 65/117 |
| 2015/0376047 A1 * | 12/2015 | Fabian | .................. | C03B 19/14 65/17.4 |
| 2016/0289116 A1 * | 10/2016 | Langner | ................ | C03C 13/045 |
| 2017/0217830 A1 * | 8/2017 | Kadomi | .................. | C03B 19/06 |
| 2022/0041489 A1 * | 2/2022 | Ochs | ................... | C03B 19/1423 |

FOREIGN PATENT DOCUMENTS

| | | | | |
|---|---|---|---|---|
| EP | 0146659 A1 * | 7/1985 | ........... | C03C 13/045 |
| EP | 198980 A * | 10/1986 | ......... | C03B 19/1415 |
| EP | 1458016 A1 * | 9/2004 | ....... | C03B 37/01413 |
| JP | H0637311 | 11/1986 | | |
| JP | S61247626 | 11/1986 | | |
| JP | 862260728 | 11/1987 | | |
| JP | S62252335 A * | 11/1987 | ........... | C03B 37/014 |
| JP | S62260728 A * | 11/1987 | ....... | C03B 37/01446 |
| JP | H05330831 A * | 12/1993 | ....... | C03B 37/01413 |
| JP | H07330366 A * | 12/1995 | ......... | C03B 37/0142 |
| JP | 2001247317 A * | 9/2001 | ......... | C03B 19/1423 |
| JP | 2007-525592 | 9/2007 | | |
| JP | 2008184372 A * | 8/2008 | ......... | C03B 37/0146 |
| JP | 2015-535795 | 12/2015 | | |
| JP | 2022-31249 | 2/2022 | | |
| WO | WO-8607348 A * | 12/1986 | ....... | C03B 37/01807 |
| WO | WO-0007950 A1 * | 2/2000 | ......... | C03B 19/1415 |
| WO | WO-0026151 A1 * | 5/2000 | ......... | C03B 19/1415 |

OTHER PUBLICATIONS

Harold Simmons Booth and Reuben Alexander Osten, The Fluorination of Chlorodisiloxane. Silicon Oxyfluoride, Journal of the American Chemical Society, vol. 67, pp. 1092-1096, Jul. 1945.

* cited by examiner

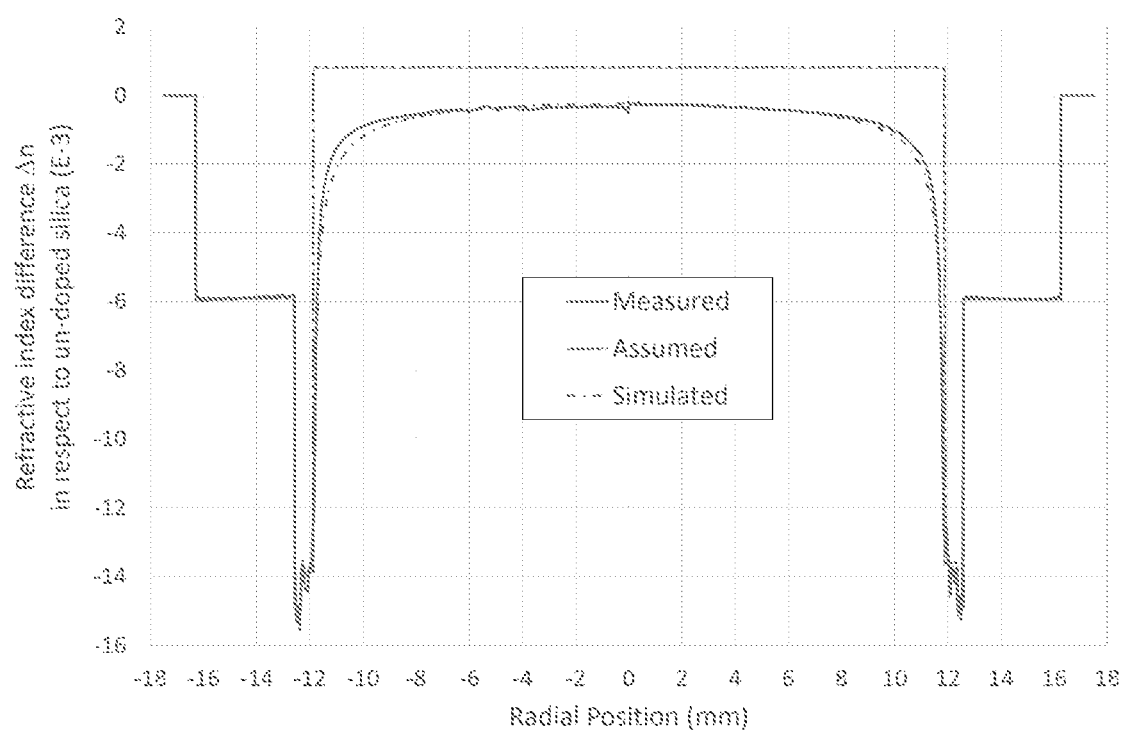

PROCESS FOR THE PREPARATION OF FLUORINATED QUARTZ GLASS

CROSS-REFERENCED TO RELATED APPLICATION

This Utility patent application claims priority to European Application No. 20189825.1 filed on Aug. 6, 2020, which is incorporated herein by reference.

TECHNICAL FIELD

One aspect relates to a process for the production of fluorinated quartz glass and to the fluorinated quartz glass obtainable by this process according to one embodiment. A further aspect is the use of alternative and improved fluorinating agents for the production of fluorinated quartz glass.

BACKGROUND

To produce synthetic quartz glass, $SiO_2$ particles are generated from a silicon-containing starting substance in a CVD process by hydrolysis or oxidation and deposited on a moving carrier. A distinction can be made between external and internal deposition processes. In external deposition processes, the $SiO_2$ particles are deposited on the outside of a rotating carrier. Examples of such external deposition processes are the so-called OVD process (Outside Vapour Phase Deposition), the VAD process (Vapour Phase Axial Deposition), the POD process (Plasma Outside Deposition) or the PECVD process (Plasma Enhanced Chemical Vapour Deposition). The best-known examples of an internal deposition process are the MCVD process (Modified Chemical Vapour Deposition), the FCVD process (Furnace Chemical Vapour Deposition) and the PCVD process (Plasma Chemical Vapour Deposition), in which $SiO_2$ particles are deposited on the inner wall of a tube heated from the outside.

At sufficiently high temperatures in the area of the carrier surface, the $SiO_2$ particles vitrify directly, which is also known as "direct vitrification". In contrast, in the so-called "soot process", the temperature during deposition of the $SiO_2$ particles is so low that a porous $SiO_2$ soot layer is obtained, which is then sintered into transparent quartz glass in a separate process step. Both the direct vitrification process and the soot process result in a dense, transparent, high-purity and synthetic quartz glass.

By introducing foreign atoms into the quartz glass, its physical properties can be influenced. For example, doping quartz glass with fluorine leads to a lowering of the refractive index. Fluorine-doped quartz glass is therefore used, among other things, for the production of light-conducting refractive index structures in optical fibers, for example for special fibers for light power transmission that have one or more F-doped, refractive index-reduced cladding layers, for the production of active high-power laser fibers and their precursors with F-doped outer cladding layer, for fluorine-doped tubes and capillaries that are used, among other things, for fiber combiners, for bending-insensitive fibers or in so-called "ultra low loss fibers". A number of processes are available to the person skilled in the art. For example, as a semi-finished product for such optical fibers, either a preform can be used which has a refractive index profile in the radial direction and which can be drawn directly into the desired fiber. Alternatively, a rod-shaped or tubular cylinder having at least one layer of fluorine-doped quartz glass can be used. This can be elongated together with other cylindrical components as an ensemble in coaxial arrangement to the fiber. Furthermore, such fluorine-doped quartz glass cylinders are used in laser and semiconductor production.

The production of fluorine-doped quartz glass is known from the prior art. US 2001/0018835 A, for example, relates to the production of UV-resistant, F-doped quartz glass, in which soot bodies are heated in an atmosphere of hydrogen or oxygen and, in a subsequent process step, sintering takes place in a fluorine-containing atmosphere. This two-stage treatment is intended to improve the UV transmission of the resulting quartz glass.

In addition to this method of subsequent fluorination of, for example, quartz glass soot bodies, methods are also known in which the fluorination agent is already present during the formation of the quartz glass body.

An example of such a process is known from U.S. Pat. No. 6,598,425. In this process, a silicon-containing starting compound, for example OMCTS, is mixed with fluorine compounds and injected into an atomization burner. The corresponding fluorine compounds are either $CF_4$ or other, but unspecified perfluorine compounds. From the overall disclosure of this prior art, it can be derived that the perfluoro compounds are the commonly used perfluoro compounds $SF_6$, $C_2F_6$ and $NF_3$. Complex organic perfluoro compounds cannot be derived from this prior art as suitable fluorinating agents. However, the so-called perfluorinated gases $CF_4$, $SF_6$, $C_2F_6$ and $NF_3$ illustrate a considerable global warming potential (GWP) and remain in the atmosphere for a very long time due to their chemical stability. Due to tightening environmental laws and regulations, it is to be expected that the marketing of such substances will become increasingly difficult and their commercial availability will decrease, so that they will no longer be available for the purpose of manufacturing fluorinated quartz glasses, at least not permanently. Another disadvantage of the fluorinating agents known from the prior art is their low boiling point, which makes handling difficult. Thus, for fluorinating agents with a low boiling point, relatively large volumes are required in the equipment used, the corresponding fluorinating agents have to be stored in pressurized gas cylinders in a relatively costly manner and, in addition, higher safety standards are usually required.

In the prior art U.S. Pat. No. 6,698,247, the preparation of a fluorine-doped quartz glass is also described, but a corresponding fluorine derivative is used as the silicon-containing precursor compound. This method has the disadvantage that the corresponding silicon-containing precursor compound must first be prepared for the production of the quartz glass and therefore one cannot fall back on the possibly available and commonly used silicon-containing precursor compounds, for example OMCTS.

In addition, the prior art EP 2 736 856 A and DE 102 31 037 A describe processes in which a quartz glass body is produced by a plasma build-up and direct vitrification.

Specifically, the prior art EP 2 736 856 A discloses a plasma deposition process for the production of an optical preform with a cladding glass layer of fluorine-doped quartz glass, in which $SiO_2$ particles are formed in the presence of fluorine by means of a plasma torch and deposited in layers on the cylindrical cladding surface of a cylindrical substrate body of quartz glass rotating about its longitudinal axis and vitrified to form the cladding glass layer, wherein the plasma torch and the substrate body are moved relative to one another in such a way that the plasma torch moves in a reversing manner between two turning points along the substrate body and wherein a heating element acts in a heating manner on the region of one turning point when the plasma torch is located in the region of the other turning point.

Furthermore, the prior art DE 102 31 037 A discloses a process for producing a synthetic quartz glass preform by means of a plasma-assisted deposition process by feeding a hydrogen-free media stream containing a glass starting material and a carrier gas to a multi-nozzle deposition burner, the glass starting material is introduced into a plasma zone by means of the deposition burner and is oxidized therein with the formation of $SiO_2$ particles, the $SiO_2$ particles are deposited on a deposition surface and are thereby directly vitrified. Thereby, the media stream is focused by means of the deposition burner in the direction of the plasma zone. This prior art process is suitable for the production of fluorine-doped quartz glass using a glass starting material containing $SiF_4$ or $SF_6$ as the fluorine-containing component.

U.S. Pat. No. 4,645,524 describes a process for the preparation of a sodium doped glass by vapour deposition, whereby the process uses a sodium fluoroalkoxide vapour and a $SiCl_4$ vapour. Both vapours are simultaneously supplied into a reaction zone of a burner, where, with heating/oxidation of the vapour mixture, a sodium-doped $SiO_2$ soot body is then formed. Even though the sodium compounds used in this process may have a fluorine atom in their structures, the resulting glass is free of any fluorine. This can be derived from the table 1 of U.S. Pat. No. 4,645,5234 in which the compositions of the prepared glass materials are described (up to 100 wt.-%) and whereby in none of the specific prepared glass a fluorine content is disclosed. That said, U.S. Pat. No. 4,645,524 does not disclose how to fluorinate a quartz glass.

US 2015/037513 A describes a method for forming an optical coating on a substrate having a first coating, the method including depositing a powder coating on the first coating from a product flow wherein the product flow results from a chemical reaction in the flow and wherein the powder coating consolidates under appropriate conditions into an optical coating. Thereby, the optical coating and the first coating, following consolidation, have a difference in index-of-refraction of at least about 1%. A wide range of compositions is used to form these coatings, for example silicate glass with different dopants (e.g. phosphate, germanium or boron dopants) to be able to influence the refractive index and other optical properties. For these and other reasons there is a need for the present embodiment.

SUMMARY

An object of one embodiment is to provide a process for the production of fluorine-doped quartz glass in which alternative fluorinating agents are used and which allow the production of a fluorinated quartz glass, wherein the fluorinating agents have a low global warming potential and furthermore do not require that the fluorine doping, as described in particular in U.S. Pat. No. 6,698,247, is first introduced synthetically into the silicon-containing precursor material of the quartz glass. Thus, it is should be possible to use conventional fluorine-free silicon-containing starting materials.

Another object of one embodiment is to provide a process for the production of fluorinated quartz glass by means of alternative fluorinating agents which can be efficiently used for the fluorination of quartz glasses.

It is also an object of one embodiment to provide a process which permits the production of fluorinated quartz glass which has a high fluorine content and a homogeneous distribution of the dopant.

Furthermore, it is an object of one embodiment to provide a method for the production of fluorine-doped quartz glass, wherein the quartz glass has a high content of fluorine while having low blistering.

Finally, it is a further object of one embodiment to provide a process for the production of fluorinated quartz glass in which a fluorinating agent is used that can be handled easily, in which relatively large volumes of the apparatus used are not required, relatively complex handling with pressurized gas cylinders can be avoided and, in addition, no particularly high safety standards need to be observed.

These tasks are solved by using new fluorinating agents. These new fluorinating agents are characterized by a higher boiling point compared to the prior art, which at least partially simplifies the handling of the fluorinating agents. The fluorinating agents according to one embodiment have a boiling point of greater than or equal to $-10°$ C. and can thus be supplied to an evaporator in a simple manner.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates a refractive index profile analysis of a preform batch in accordance with one embodiment.

DETAILED DESCRIPTION

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the FIGURE(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

Accordingly, one embodiment relates to a process for the preparation of a fluorinated quartz glass including at least the following process steps:
a. generation of $SiO_2$ particles in a synthesis burner;
b. deposition of the $SiO_2$ particles resulting from process step a. to form a body;
c. vitrification of the body resulting from process step b, The process according to one embodiment is then characterized in that a fluorinating agent having a boiling point greater than or equal to −10° C. is passed to the synthesis burner during process step a.

In the context of the present embodiments, boiling points present at normal pressure (1013 mbar) are assumed.

It is thus intended that in the process according to one embodiment, the silicon-containing precursor material and the fluorinating agent are introduced into the synthesis burner at least partially simultaneously, whereby the fluorinating agent has a relatively high boiling point so that easy handling of the fluorinating agent is possible. This allows the formation of the quartz glass body with simultaneous incorporation of the fluorine doping.

In the context of one embodiment, a fluorinating agent is understood to be a chemical substance containing fluorine atoms and capable of incorporating fluorine atoms during the construction of the quartz glass body.

In a preferred embodiment, the fluorinating agent has a boiling point of greater than or equal to −5° C., in one embodiment greater than or equal to 0° C., in one embodiment greater than or equal to 5° C., in one embodiment greater than or equal to 10° C., in one embodiment greater than or equal to 15° C., in one embodiment greater than or equal to 20° C.

The upper boiling point of the fluorinating agent proposed according to one embodiment is not subject to any particular technical limitations in that the fluorinating agent can be evaporated in the synthesis burner under the usual process conditions for the production of synthetic quartz glass.

In the context of one embodiment, fluorinating agents are preferred which have a boiling point of less than or equal to 300° C., in one embodiment less than or equal to 275° C., in one embodiment less than or equal to 250° C., in one embodiment less than or equal to 225° C., in one embodiment less than or equal to 200° C., in one embodiment less than or equal to 175° C., in one embodiment less than or equal to 150° C.

The simplified handling of these alternative fluorinating agents results directly from the boiling point ranges described above.

Thus, the fluorinating agents provided according to one embodiment have a boiling point range of −10 to 300° C., in one embodiment −5 to 275° C., in one embodiment 0 to 250° C., in one embodiment 5 to 225° C., in one embodiment 10 to 200° C., in one embodiment 15 to 175° C., in one embodiment 20 to 150° C.

The fluorinating agents provided according to one embodiment are in particular one or more fluorinating agents selected from the group consisting of
 i. oxygen-containing fluorinating agents; and
 ii. nitrile-containing fluorinating agents.

In the context of one embodiment, it is also possible to use mixtures of the aforementioned oxygen-containing and nitrile-containing fluorinating agents in the process according to one embodiment, mixtures being understood in the context of one embodiment to mean both mixtures of pure oxygen-containing fluorinating agents, mixtures of pure nitrile-containing fluorinating agents and mixtures of oxygen-containing and nitrile-containing fluorinating agents.

Preferred oxygen-containing fluorinating agents are now described in more detail below.

In a first embodiment, the oxygen-containing fluorinating agents used are perfluoroketones of the general formula (I)

$$R_{F1}\text{---}CO\text{---}R_{F2} \qquad (1)$$

wherein, $R_{F1}$ is selected from the group consisting of perfluorinated carbon groups having 1 to 7 carbon atoms and fluorine, and $R_{F2}$ is selected from the group consisting of perfluorinated carbon groups having 1 to 7 carbon atoms.

In a preferred embodiment of this first embodiment, the perfluorinated carbon group includes 1 to 6, in one embodiment 2 to 6, in one embodiment 2 to 5, in one embodiment 2 to 4 carbon atoms.

Specific examples of compounds of this first embodiment are
 a) perfluoro(2-methyl-3-pentanone); or 1,1,1,2,2,4,5,5-nonafluoro-4-(trifluoromethyl)-3-pentanone;
 b) perfluoro(2-methyl-3-butanone), or 1,1,1,3,4,4,4-heptafluoro-3-(trifluoromethyl)-2-buntanone; and
 c) perfluoro(2,2,-dimetyl-3-butanone).

The compounds
 a) perfluoro(2-methyl-3-pentanone); or 1,1,1,2,2,4,5,5-nonafluoro-4-(trifluoromethyl)-3-pentanone; and
 b) perfluoro(2-methyl-3-butanone), or 1,1,1,3,4,4,4-heptafluoro-3-(trifluoromethyl)-2-buntanone are commercially available from the company 3M Deutschland GmbH under the tradenames NOVEC® 649 and NOVEC® 5110 and are in particular preferred.

In a second embodiment, the oxygen-containing fluorinating agents used are perfluoroethers of the general formula (II)

$$R_{F1}\text{---}C(X_1)(X_2)O\text{---}R_{F2} \qquad (II),$$

wherein $R_{F1}$ is selected from the group consisting of perfluorinated carbon groups having 1 to 7 carbon atoms and fluorine, and $R_{F2}$ is selected from the group consisting of perfluorinated carbon groups having 1 to 7 carbon atoms; and the residues $X_1$ and $X_2$ are F or $CF_3$.

In a preferred embodiment of this second embodiment, the perfluorinated carbon group consists of 1 to 6, in one embodiment 2 to 6, in one embodiment 2 to 5, in one embodiment 2 to 4 carbon atoms.

Specific examples of compounds of this second embodiment are
 a) perfluoro-1-methoxypropane;
 b) perfluoro-2-isopropoxy-2-methylpentane;
 c) perluoro-1-ethoxyheptane; and
 d) perfluoro-2-n-butoxy-2-methylpentane.

In a third embodiment, the oxygen-containing fluorinating agents used are hydrofluoroethers of the general formula (III)

$$R_{F1}\text{---}C(X_1)(X_2)O\text{---}R_2 \qquad (III),$$

wherein $R_{F1}$ is selected from the group consisting of perfluorinated carbon groups having 1 to 7 carbon atoms and fluorine;
$R_2$ is a non-fluorinated hydrocarbon group having from 1 to 3 carbon atoms; and
the residues $X_1$ and $X_2$ stand for F or $CF_3$.

In a preferred embodiment of this third embodiment, the perfluorinated carbon group includes from 1 to 6, in one embodiment from 2 to 6, in one embodiment from 2 to 5, in one embodiment from 2 to 4, carbon atoms.

Specific examples of compounds of this third embodiment are
 a) methylnonafluorbutylether;
 b) ethylnonafluorbutylether; and
 c) 2-trifluormethyl-3-ethoxydodekafluorhexane.

The aforementioned specific examples of the first to third embodiments are commercially available.

In the following, preferred nitrile-containing fluorinating agents are now described in more detail as a fourth embodiment.

The nitrile-containing fluorinating agents are in one embodiment perfluoronitriles of the general formula (IV)

$$R_{F1}\text{—C}\equiv\text{N} \quad\quad\quad (IV)$$

wherein
$R_{F1}$ is selected from the group consisting of a perfluorinated carbon group having 1 to 7 carbon atoms. In a preferred embodiment of this fourth embodiment, the perfluorinated carbon group consists of 1 to 6, in one embodiment 2 to 6, in one embodiment 2 to 5, in one embodiment 2 to 4, carbon atoms.

Specific examples of compounds of this fourth embodiment are
a) heptafluoro-isobutyronitrile; or
b) 2,3,3,3-tetrafluoro-2-(trifluoromethyl)propanenitrile.

These compounds are also commercially available.

It has been a surprise, that the precursors according to one embodiment are suitable at all to produce fluorine doped silica glass. This was not obvious because the mentioned molecules are much larger compared to other typical fluorine precursors such as $SiF_4$, $CF_4$, $NF_3$ and $SF_6$, which were typically utilized for glass production.

Due to the large molecule size of the fluorinating agents according to one embodiment, there is the risk that the molecule would not fully be cracked in the plasma process and the larger molecule fragments could cause any undesired effects such as increased bubble or defect formation in the glass, a too low fluorine incorporation in the glass matrix, an unstable plasma flame, undesired luminescence effects in the cladding, a strong gas phase etching effect, which could hamper the efficient growth of the F-doped silica layer, or a higher stress in the preform cladding, which could lead to preform cracks.

In addition, the fluorinating agents according to one embodiment consist of multiple carbon atoms, which could form undesired carbon particles or carbon black (carbon soot) either in the preform cladding or in the deposition chamber.

However, these expected drawbacks do not occur in case the present embodiment is carried out as described herein.

In one embodiment, the used fluorinating agents are free of alkali elements, in particular free of sodium.

In a further embodiment, the fluorinating agent is not a sodiumfluoroalkoxide.

As already illustrated by the above examples, perfluorinated carbon groups in the context of one embodiment are understood to be organic compounds in which the hydrogen atoms in the carbon network of at least one carbon atom have been completely replaced by fluorine atoms. In one embodiment, all hydrogen atoms in the carbon network have been replaced by fluorine atoms.

In the context of one embodiment, the use of the fluorinating agents of the general formulae (I) and (II) is preferred in one embodiment because they do not contain hydrogen atoms. A hydrogen content in the fluorinating agent could be disadvantageous because HF molecules are formed under the applied decomposition conditions, which in turn etch quartz glass components in the burner (reduced service life) and the silica soot and at the same time promote OH incorporation in the quartz glass.

In the following, the individual process steps a. to c. are described in more detail.

Procedure Step a.

To produce the quartz glass body, a feedstock containing at least one polymerisable polyalkylsiloxane compound or $SiCl_4$ is first evaporated to form a feedstock vapour.

In principle, any polymerisable polyalkylsiloxane compound suitable for the production of synthetic quartz glass can be used according to one embodiment. In the context of one embodiment, the term poly alkylsiloxane encompasses both linear (including branched structures) and cyclic molecular structures.

Particularly suitable cyclic representatives are polyalkylsiloxanes with the general molecular formula $$Si_pO_p(R)_{2p},$$

wherein p is an integer greater than or equal to 2. The residue "R" is an alkyl group, in the simplest case a methyl group.

Polyalkylsiloxanes are characterized by a particularly high proportion of silicon per weight percent, which contributes to the economic efficiency of their use in the production of synthetic quartz glass.

The polyalkylsiloxane compound is in one embodiment selected from the group consisting of hexamethylcyclotrisiloxane (D3), octamethylcyclotetrasiloxane (D4), decamethylcyclopentasiloxane (D5), dodecamethylcyclohexasiloxane (D6), tetradecamethylcycloheptasiloxane (D7), hexadecamethylcyclooctasiloxane (D8) and their linear homologues and any mixtures of the above compounds. The notation D3, D4, D6, D7 and D8 is taken from a notation introduced by General Electric Inc. in which "D" represents the group $[(CH_3)_2Si]$—O—. The notation is known to people working in the field.

Mixtures of the aforementioned polyalkylsiloxane compounds may also be used within the scope of the present embodiments.

Because of its large-scale availability in high purity, octamethylcyclotetrasiloxane (OMCTS) is currently preferred. In the context of one embodiment, it is therefore particularly preferred if the polyalkylsiloxane compound is octamethylcyclotetrasiloxane (D4). It is known to the person skilled in the art that alternative raw materials such as silicon tetrachloride or hexamethyldisiloxane (HMDS) or others can also be used.

In principle, it is possible for the feedstock to be subjected to purification before being introduced into the process step. Such purification processes are known to the person skilled in the art.

The evaporation of the feedstock of the $SiO_2$ precursor can take place with or without the presence of a carrier gas component. In one embodiment, the vaporisation of the feedstock occurs in the presence of a carrier gas, as this allows the vaporisation to occur at temperatures below the boiling point of the polyalkylsiloxane compound. This means that the feedstock vapour in one embodiment additionally includes a carrier gas. Such an approach is preferred if the evaporation of the feedstock is to take place below its boiling point. The inert gas is in one embodiment chemically inert and is further in one embodiment nitrogen or argon. Alternatively, oxygen can also be used as the carrier gas. In this case, the molar ratio of the polymerisable polyalkylsiloxane compound to the carrier gas is in one embodiment in the range from 0.01 to 2, particularly in one embodiment in the range from 0.02 to 1.5, very particularly in one embodiment in the range from 0.05 to 1.25. In particular, it is preferred that nitrogen with a moisture content of less than 40 ppm by volume is used as the carrier gas and OMCTS is used as the polyalkylsiloxane compound. It is further preferred that the molecular ratio of OMCTS to nitrogen is in the range of 0.015 to 1.5.

The process step of evaporation is known to the person skilled in the art. Depending on the selected molecular ratio of the poly alkylsiloxane compound and the carrier gas, the polyalkylsiloxane compound is in one embodiment converted into a vapour phase at temperatures between 120 and 200° C. The evaporation temperature in the evaporation chamber should always be at least a few degrees above the dew point of the polyalkylsiloxane compound. The dew point is in turn dependent on the selected molecular ratio of polyalkylsiloxane compound and carrier gas. In a preferred embodiment, the polyalkylsiloxane compound is preheated to temperatures between 40 and 120° C. before evaporation and then sprayed into an evaporation chamber which has a higher temperature than the preheating of the feedstock. In a preferred embodiment, the inert carrier gas can additionally be preheated to temperatures of up to 250° C. before it is supplied to the evaporation chamber. It is advantageous that the temperature in the evaporation chamber is always on average above the dew point temperature of the mixture of polyalkylsiloxane and carrier gas. Suitable evaporation processes are described, for example, in the international patent applications WO 2013/087751 A and WO 2014/187513 A as well as the German patent application DE 10 2013 209 673 A.

In the context of one embodiment, the term "dew point" describes the temperature at which a state of equilibrium is reached between condensing and evaporating liquid.

When using temperatures below the boiling point of the feedstock, evaporation in one embodiment takes place together with an inert carrier gas.

In the context of one embodiment, "vaporisation" is understood to be the process by which the feedstock is substantially converted from the liquid phase to a gaseous phase. This is in one embodiment done by using temperatures, as described above, which are above the dew point of the polymerisable polyalkylsiloxane compound as the main component of the feedstock. The person skilled in the art is aware that, from a process engineering point of view, it cannot be ruled out that small drops of liquid of the feedstock can be entrained. Thus, a feedstock vapour is in one embodiment generated which in one embodiment contains not less than 97 mol %, in one embodiment not less than 98 mol %, particularly in one embodiment not less than 99 mol %, very particularly in one embodiment not less than 99.9 mol %, of gaseous components.

The generated feedstock vapour is introduced into a reaction zone where the feedstock vapour is converted to $SiO_2$ particles by oxidation and/or hydrolysis. The resulting $SiO_2$ particles are then separated to form the quartz glass body.

Simultaneously, the fluorinating agents described above are introduced into the synthesis burner and also converted in the sense of the evaporation described above, so that the quartz glass body is formed with the incorporation of the corresponding fluorine doping.

The aforementioned fluorinating agents are thus introduced into the synthesis burner separately from the silicon-containing precursor material in the context of one embodiment and react with the silicon-containing precursor material to form a fluorine-doped quartz glass.

The synthesis burner used in the process according to one embodiment may be a synthesis burner with flame hydrolysis or a plasma synthesis burner, wherein the fluorinating agent described above is in one embodiment introduced into the flame of the synthesis burner used.

The synthesis burner may be, for example, a plasma synthesis burner selected from the group consisting of a RF plasma burner (HF plasma burner), microwave plasma burner, NF plasma burner, direct current plasma burner and laser plasma burner. The plasmas used can be operated at atmospheric, low or high pressure.

In process step a., the fluorinating agent provided according to one embodiment can be supplied to the synthesis burner both in liquid or gaseous form. Suitable methods are sufficiently known to the person skilled in the art.

If in the process according to one embodiment the fluorinating agent is supplied in a gaseous form to the synthesis burner, the fluorinating agent can be previously evaporated in an evaporator. For example, direct evaporation of the fluorinating agent is suitable for this purpose. Alternatively, it is possible that the fluorinating agent is supplied in gaseous form to the synthesis burner and is previously provided in a carrier gas in a bubbler using a carrier gas. In this method, a carrier gas flows through the fluorinating agent to be vaporised, whereby the fluorinating agent is enriched in the carrier reacts and thus incorporates fluorine within the $SiO_2$ particles.

Alternatively, the fluorinating agent provided according to one embodiment can be supplied to the synthesis burner in liquid form, for example in atomized form. For this purpose, the fluorinating agent can be mixed in liquid form with the silicon-containing precursor material beforehand. The resulting vapour is then only formed in the flame or in the plasma, depending on which process is used.

In the context of one embodiment, it is also possible that the fluorinating agent provided according to one embodiment is converted into an aerosol in a classical ultrasonic nebulizer and is thus supplied to the synthesis burner or the flame or plasma of the synthesis burner.

Within the scope of one embodiment, it is of course also possible for all materials to be sprayed separately into the flame or plasma. For this purpose, all devices known to the person skilled in the art for atomizing liquids can be used. Examples include devices with single-substance nozzles, dual-substance nozzles, mechanical atomizers and electro-spray atomizers.

In a first embodiment, the process according to one embodiment is carried out in such a way that the process steps b. of depositing the $SiO_2$ particles resulting from process step a. to form a body and c. of vitrifying the body resulting from process step b. are carried out subsequently. In the context of one embodiment, this method of the first embodiment is referred to as a soot process.

In a second embodiment, the process according to one embodiment is carried out in such a way that the soot construction is carried out with a plasma burner (torch) and the resulting material is vitrified directly during the deposition.

These two procedures are now described in more detail hereafter:

First Embodiment

In the first embodiment, as already mentioned, the process according to one embodiment is carried out in such a way that the process steps b. of agglomerating the $SiO_2$ particles resulting from process step a. to form a body and c. of vitrifying the body resulting from process step b. are carried out subsequently. The process steps b. and c. are now described in more detail below.

Process Step b.

In the context of one embodiment, the process step b. of agglomerating the $SiO_2$ particles resulting from process step a. into a body can be carried out in different ways. Without being limited to a particular embodiment, three different embodiments of process step b. are described hereafter as examples:

First Embodiment of the Process Step b.

Process step b. can be carried out, for example, in such a manner that the deposition of $SiO_2$ particles to form a body in process step b. is carried out outside of a substrate (external deposition process).

These processes are OVD (Outside Vapor Deposition) processes, VAD (Vapor Axial Deposition) processes, POD (Plasma Outside Deposition) processes, APCVD (Atmospheric Pressure Chemical Vapour Deposition/Advanced Plasma Chemical Vapour Deposition) processes or PECVD (Plasma Enhanced Chemical Vapour Deposition) processes.

All these processes are known to the person skilled in the art.

Second Embodiment of Process Step b.

Furthermore, it is possible that process step b. is carried out in such a manner that the deposition of $SiO_2$ particles to form a body in process step b. is carried out in a substrate tube (internal tube coating process).

These processes are the MCVD (Modified Chemical Vapor Deposition) processes, FCVD (Furnace Chemical Vapor Deposition) processes, PCVD (Plasma Chemical Vapor Deposition) processes or PICVD (Plasma Impulse Chemical Vapor Deposition) processes, all known in the prior art.

In the MCVD (Modified Chemical Vapour Deposition) process, the silicon-containing starting material is provided together with the fluorination agent in accordance with one embodiment inside a substrate tube and are heated from the outside with a heating burner. Although, technically speaking, no synthesis reaction takes place in the flame, the burner used externally in this process is referred to as a synthesis burner in the context of one embodiment.

In the FCVD (Furnace Chemical Vapour Deposition) process, the silicon-containing starting material is provided together with the fluorinating agent according to one embodiment inside a substrate tube and are heated from the outside by an electric heating zone. Although, technically speaking, no burner with a flame is used in this process, the heating zone used externally in this process is referred to as a synthesis burner in the context of one embodiment.

In the PCVD (Plasma Chemical Vapour Deposition) process or PICVD (Plasma Impulse Chemical Vapour Deposition) process, the silicon-containing starting material is provided together with the fluorination agent according to one embodiment inside a substrate tube and are heated from the outside by igniting the plasma induced from the outside in the tube. Although, technically speaking, no burner with a flame is used in this process, the plasma used externally in this process is referred to as a synthesis burner in the context of one embodiment.

In principle, in all of these internal deposition embodiments, the heat source serves to dissociate the precursor substance and to synthesize the doped particles, which are then deposited in the tube either as a soot layer or directly vitrified. In all processes taking place in the tube, extra oxygen is added.

Third Design of the Procedural Step b.

Furthermore, it is possible to insert a rod into the substrate tube, which for example is then coated by a plasma process in the tube. At the end of the process according to one embodiment, the coated rod can either be removed from the tube or the substrate tube, which is also internally coated, is collapsed directly onto the coated core rod to produce the preform.

The synthesis reaction in a substrate tube of the second and third embodiments may be carried out by applying heat from the outside, for example by means of an E-furnace, $H_2O_2$ burner, by generating a plasma inside the substrate tube or a laser burner.

Usually, these measures provided according to one embodiment for the deposition of quartz glass particles for the formation of a quartz glass body are carried out in a reaction chamber. Suitable reaction chambers are, for example, an ALD (Atomic Layer Deposition) or MLD (Molecular Layer Deposition) reaction chamber.

In the context of one embodiment, process step b. can be carried out in such a way that a porous soot body is first formed from the silicon-containing precursor material, which is then vitrified in the subsequent process step c. This method refers to the soot process already described at the beginning of the present specification.

A soot body in the context of one embodiment is a porous blank obtained by depositing $SiO_2$ particles on a carrier and which is converted into the final quartz glass by vitrification. In general, the structure of the $SiO_2$ soot body is sufficiently gas permeable, allowing uniform gas phase treatment or sintering. In the area of layers with a higher density, this is only possible to a limited extent, since these layers represent diffusion barriers that can cause an uneven treatment result during drying and sintering processes. Due to long diffusion paths, this problem arises in particular with large-volume $SiO_2$ solids with high wall thicknesses. In the context of one embodiment, the doping of the $SiO_2$ soot body coincided with the incorporation of the fluorine doping.

The carrier and or substrate according to first and second embodiment of process step b may be, for example, a high purity silica core rod or tube, fused silica with low OH content (e.g., F300, F310, F500), fused silica with high OH content (e.g., F100, F110), fluorine doped fused silica (e.g., F320), Ge-doped fused silica, rare earth doped silica etc. Within the scope of one embodiment, the person skilled in the art can deposit analogously on other doped and undoped fused silica core rods.

A variety of methods are available to the person skilled in the art for the production of such soot bodies. Examples include the so-called CVD processes, in particular the OVD and VAD processes. In the OVD (Outside Vapor Deposition) process, $SiO_2$ particles are deposited on a cylindrical surface of an elongated carrier that rotates about its longitudinal axis. The carrier can be made for example of ceramic, graphite or quartz glass. In the VAD (Vapor Axial Deposition) process, the $SiO_2$ particles are assembled on a disc-shaped rotating carrier in the direction of the longitudinal axis of the soot body. In both processes, the $SiO_2$ particles can be deposited layer by layer on the carrier to form the soot body.

The corresponding $SiO_2$ soot bodies have a porous structure so that the fluorination agents can penetrate through the pores of the $SiO_2$ soot body into the three-dimensional structure of the body and cause homogeneous fluorination of the $SiO_2$ soot body.

In one embodiment of the process according to one embodiment, the porous soot body obtained in process step b. is vitrified in the subsequent process step c.

Process Step c.

In process step c. of the process according to one embodiment, the fluorinated soot body is vitrified. In one embodiment, the vitrification temperature in process step c. is in the range of 1100 to 1500° C., in one embodiment 1150 to 1350° C. In order to avoid blister formation in the later quartz glass, it has proven advantageous if the vitrification is performed under negative pressure or under a helium or helium/fluorinating agent mixed gas atmosphere. This also has the advantage that the material of the process chamber is not affected by aggressive and corrosive gases and is therefore subject to less deterioration.

In order to protect the materials, in particular the process chamber, it has proven to be advantageous if the doping of the soot body and the vitrification of the fluorinated soot body take place in different process chambers in the soot process. Therefore, according to the process of one embodiment, the vitrification in process step c. takes place in a second process chamber which is different from the first process chamber. This way, each of the process chambers can be optimized for the corresponding process steps and excessive stress on the materials, for example due to aggressive and corrosive gases at high temperatures, is avoided. Therefore, an embodiment is preferred in which the vitrification in process step c. takes place in a second process chamber that is different from the first process chamber in which process steps a. and b. are carried out. The second process chamber may, for example, be a zone furnace in which the vitrification of the fluorinated soot body takes place zone by zone. In one embodiment, the second process chamber is not exposed to fluorine-containing gases.

The process step c. of vitrifying the fluorinated $SiO_2$ soot body can be carried out in the usual furnaces known per se to the person skilled in the art. Examples are furnaces with a constant temperature, gas pressure sintering furnaces, vacuum furnaces, flow-through furnaces, furnaces at normal or low pressure.

Furthermore, the second process chamber is in one embodiment a vitrification furnace. Such furnaces are known to the person skilled in the art and can be used in accordance with the respective requirements for the size and shape of the soot body in the process according to one embodiment.

Second Embodiment

In a further embodiment of the process according to one embodiment, process steps b. and c. are carried out at least partially simultaneously and the resulting body is already vitrified with the synthesis burner.

In the second embodiment, a plasma burner (torch) is generally used into which the fluorinating agent according to one embodiment is introduced together with the silicon-containing starting material. The silicon-starting material can be either a polyalkylsiloxane or $SiCl_4$ as described already above.

The plasma used in this embodiment has a very high process temperature, wherein the synthesis and vitrification take place far away from thermal equilibrium. Therefore, much higher fluorine concentrations can be produced in the glass with this second embodiment than with the previously described processes via the soot body route (first embodiment). Surface temperatures in the range of 2500° C. are usually achieved.

A plasma in which fluorine-containing quartz glass is synthesised can be generated in different ways. In the POD process, for example, a so-called plasma torch is used.

Corresponding class-forming processes of the second embodiment, in which the fluorinating agents proposed in accordance with one embodiment are used, are described in EP 2 736 856 A and DE 102 31 037 C.

Accordingly, the process of the second embodiment according to one embodiment is carried out in such a way that in the context of a POD process (Plasma Outside Deposition) already mentioned above, a cladding glass layer of fluorine-doped quartz glass is produced on a cylinder outer jacket of a core rod or tube made of quartz glass. For this purpose, a plasma burner (torch) is used into which a silicon-containing starting compound, oxygen and a fluorine compound are introduced and which is moved in a reversing motion along the rotating core rod parallel to its longitudinal axis. Through reaction of the starting substances in the plasma flame, fluorine-doped $SiO_2$ is formed, which is deposited layer by layer on the core glass and is directly vitrified to form the fluorine-containing $SiO_2$ cladding glass layer.

In principle, direct vitrification can also be carried out in a tube (e.g. in the PCVD process) or on a rod inserted into a separator tube.

In the context of one embodiment, it is preferred if—as described in EP 2 736 856 A—excessive cooling of the preform in the area of one turning point of the burner movement is counteracted. This is generally done by exposing the respective cooling end of the preform to the temporary or continuous effect of direct or indirect heating. Direct heating is achieved by a heating element, indirect heating by heat emission of a heat accumulator or by reflection of a heat radiation reflector. The term "preform" is used here to describe the bond between the substrate body and the cladding glass layer, even if the cladding glass layer is not yet fully formed. In any case, in the context of this embodiment, the heating acts on one end of the preform at least when the plasma deposition takes place in the region of the other end, and it counteracts cooling of this end to the extent that its temperature is higher than it would be without the effect of the heating. Thus, in the process according to one embodiment, the axial temperature gradient is reduced by raising its minimum temperature (compared to the standard process without heating of the end regions). Although heating the preform ends is advantageous for an axially more homogeneous F-deposition or a reduction of the axial F-gradient, it is in principle also possible without heating the ends. For example, the plasma power can be changed axially during the coating process, or one lives with the larger F-gradients at the preform ends.

Further optional and preferred embodiments of this method can be found in EP 2 736 856 A, which is incorporated herein by reference.

In addition, the second embodiment can also be carried out in such a manner that a hydrogen-free medium flow containing a glass starting material and a carrier gas is introduced to a multi-nozzle deposition burner, the glass starting material is introduced into a plasma zone by means of the deposition burner and oxidized therein with the formation of $SiO_2$ particles, and the $SiO_2$ particles are deposited on a deposition surface and thereby directly vitrified, the medium flow being focused by means of the deposition burner in the direction of the plasma zone. The glass starting material contains the fluorine-containing component (fluorinating agent) proposed according to one embodiment.

Further optional and preferred embodiments of this method can be found in DE 102 31 037 C, which in this respect are incorporated by reference in one embodiment.

Within the scope of one embodiment, variations are also conceivable with respect to the second embodiment, in which no $SiO_2$ synthesis takes place in the plasma flame, but the $SiO_2$ material is introduced into the plasma in the form of a grain (possibly sand) and optionally doped with fluorine. Such a modification is described in U.S. Pat. No. 6,477,864, the disclosure of which is also incorporated by reference in one embodiment.

In a further embodiment, process steps b. and c. are carried out in an isothermal furnace with a quartz glass process tube. Corresponding furnaces are known to the person skilled in the art from the prior art.

When transporting the fluorinated soot body from the first process chamber to the second process chamber, the water content of the atmosphere can lead to diffusion of water and, as a result, to contamination with OH groups and thus to an axially and radially inhomogeneous distribution of the OH group concentration in the subsequent quartz glass. Furthermore, the presence of OH groups in the fluorinated soot body has the disadvantage that they illustrate a high absorption in the range of the usual working wavelengths of optical fibers and therefore negatively influence the quality of the later product. In order to reduce the OH concentration in the fluorinated soot body, it has proven advantageous to subject the fluorinated soot body to a drying step before vitrification.

Therefore, an embodiment in which the fluorinated soot body is subjected to a further drying step in the second process chamber prior to vitrification is preferred, wherein the drying is carried out at a temperature in a range of 700 to 1200° C. It has been illustrated that decontamination can be eliminated in this manner. By heating the fluorinated soot body to a temperature above 700° C., OH groups are released which, as a result of the porosity of the intermediate, migrate from the heating front away and leave the intermediate. To prevent already cleaned areas of the intermediate from reacting again with released water, they can be removed by purging with inert gas or by suction. It has proven advantageous to carry out the vitrification of the fluorinated soot body under reduced pressure. In this manner, simultaneous dehydration of the soot body occurs during the sintering process and any inclusions are avoided. In addition, the formation of blisters in the later quartz glass is minimised. However, this method has the disadvantage that dopants physically bound in the soot body, in particular gaseous fluorine compounds, can partially desorb during the vitrification process, especially in the outer layers. The consequence is the formation of an undesired concentration gradient and a depletion of fluorine. These processes can be carried out in the second process chamber, so that a complex modification is avoided. In order to prevent renewed contamination, it has proven advantageous if the pressure during the drying step inside the second process chamber is lower than outside the second process chamber. Therefore, an embodiment in which the pressure during the drying step in the second process chamber is less than 1 mbar is particularly preferred.

In a particularly preferred embodiment of the first embodiment generally described above, the method according to one embodiment includes the following method steps:

Process step A.1: providing a gaseous silicon-containing precursor material for the quartz material and providing a gaseous fluorinating agent in a synthesis burner;

Process step B.1: forming a quartz glass body with incorporation of the fluorine doping, for example a fluorinated soot body, wherein the soot body has an average density in a range of 18 to 30% based on the relative density of quartz glass;

Process step B.2: optionally drying the fluorinated soot body at a temperature in a range of 700 to 1100° C.;

Process step B.3: optionally chemically drying of the fluorinated soot body at a temperature in a range of 700 to 1100° C. in the presence of a chlorine-containing gas;

Process step B.4: optionally heating the fluorinated soot body to a temperature above 1000° C., in one embodiment 1000 to 1200° C., wherein the pressure inside the process chamber is in one embodiment lower than outside the process chamber; and Process step C.1: vitrification of the fluorinated soot body at a temperature above 1000° C. in the process chamber, wherein the pressure inside the process chamber is lower than outside the process chamber, forming the doped quartz glass.

In a particularly preferred embodiment of the second embodiment described above in general, the method according to one embodiment includes the following process steps:

Process step A.1: providing a gaseous silicon-containing precursor material for the quartz material and providing a gaseous fluorinating agent in a synthesis burner (e.g. plasma burner).

Process step B1/C1: deposition of the doped $SiO_2$ particles produced in the synthesis burner on a substrate rod (e.g. made of a quartz glass ceramic) and direct vitrification of the $SiO_2$ particles. The synthesis burner can be used directly for this purpose.

Another object of one embodiment is to provide a doped quartz glass obtainable according to the process of one embodiment. Such a quartz glass is characterized by a homogeneous doping with fluorine, even at high fluorine contents, and low blistering.

The properties of the quartz glass, such as refractive index and absorption maxima, can be influenced by the presence of selected further foreign atoms in the quartz glass. Therefore, an embodiment is preferred in which the quartz glass has further dopants in addition to fluorine, the dopant in one embodiment being selected from the group consisting of $Al_2O_3$, $Yb_2O_3$, $Er_2O_3$, $NbO_2$, $TiO_2$, $Ce_2O_3$, $Y_2O_3$, $B_2O_3$, $P_2O_5$, $Tm_2O_3$, $Nd_2O_3$, $Sm_2O_3$, $GeO_2$, $Ho_2O_3$, $Bi_2O_3$, $La_2O_3$, $Ga_2O_3$, $Li_2O$, $Cs_2O$ and nitrogen compounds, for example $Si_3N_4$, SiN. SiON and SiNH, and mixtures thereof. The dopants can be deposited, for example, from the gas phase, introduced and deposited as an aerosol or doped from solution.

As is known to the person skilled in the art, the refractive index of quartz glass can be adjusted by selective doping with fluorine. However, the person skilled in the art is often confronted with the problem that the amount of fluorine present in the quartz glass is limited by the manufacturing process, since, for example, the fluorine is removed from the soot body again by corresponding process steps such as drying and vitrification in a vacuum. In contrast, the quartz glass according to one embodiment is characterized by a high content of fluorine as well as a homogeneous distribution of the same in the quartz glass. Thus, in a preferred embodiment, the fluorine content in the quartz glass is 1,000 to 100,000 ppm, in one embodiment 10,000 to 90,000 ppm, in one embodiment 20,000 to 80,000 ppm, further in one embodiment 30,000 to 80,000 ppm, in each case based on parts by weight.

Quartz glass, in particular doped quartz glass, is widely used in optics and analytics. Therefore, a further object of one embodiment is the use of the doped quartz glass according to one embodiment as an optical component, optical fiber form or as part of an optical fiber.

A further object of one embodiment is the use of the fluorinating agents described above for the production of fluorinated quartz glass. With regard to particular embodiments of these uses, reference is made to the above explanations of the process according to one embodiment.

One embodiment is described in more detail by referring to the following example:

Example 1

A method of plasma outside deposition (POD) was used to manufacture a fiber preform, which had a large undoped silica core and a thin fluorine doped silica cladding with depressed refractive index. In this process, $SiCl_4$ and a fluorine precursor according to one embodiment were reacted in a high frequency oxygen plasma to form F-doped $SiO_2$ particles, which were usually deposited onto a high purity silica core rod to form the cladding layer for a fiber preform.

As a fluorinating agent, perfluoro (2-methyl-3-pentanone) ((1,1,1,2,2,4,5,5,5-nonafluoro-4-(trifluoromethyl)-3-pentanone), commercially available as NOVEC® 649, was used.

In the first experiment, standard POD parameters, which allow a stable deposition and which are not optimized to a fast deposition rate or extremely high efficiency, were applied. High purity silica F300 as a core rod was chosen, which allows to manufacture a low-OH preform.

In a first trial, it was tested if the new precursor is suitable at all to produce fluorine doped silica glass. This was not obvious because the perfluoro (2-methyl-3-pentanone) molecule is much larger compared to other typical fluorine precursors such as $SiF_4$, $CF_4$, $NF_3$ and $SF_6$, which were typically utilized for glass production.

Due to the large molecule size of perfluoro (2-methyl-3-pentanone), there was the risk that the molecule would not fully be cracked in the plasma process and the larger molecule fragments could cause any undesired effects such as increased bubble or defect formation in the glass, a too low fluorine incorporation in the glass matrix, an unstable plasma flame, undesired luminescence effects in the cladding, a strong gas phase etching effect, which could hamper the efficient growth of the F-doped silica layer, or a higher stress in the preform cladding, which could lead to preform cracks.

In addition, perfluoro (2-methyl-3-pentanone) consists of multiple carbon atoms, which could form undesired carbon particles or carbon black (carbon soot) either in the preform cladding or in the deposition chamber.

Therefore, the intention of the first trial was to check if those negative effects occur.

In the example, the deposition parameters and perfluoro (2-methyl-3-pentanone) flows were deliberately altered to achieve two different fluorine contents in the glass matrix, which led to two different refractive indices in the preform cladding.

The starting preform core material was an F300 core rod. During the process, the oxygen $O_2$ flow was kept constant at 220 l/min, the plasma power was adjusted between 15 and above 40 kW to ensure a stable deposition and the $SiCl_4$ flow was set between 10 and 70 g/min. After several hours of deposition, the initial perfluoro (2-methyl-3-pentanone) flow was increased significantly by a factor of about 1.4 and kept it constant until the end of deposition.

After deposition and cool down, the fiber preform was drawn down to a smaller diameter of ~25 mm on a horizontal drawing lathe using a graphite oven. The drawn preform sections were visually inspected using a halogen light source. This white light was coupled into the end faces of the preforms to see any defects, such as bubbles, particles, or discolorations. Furthermore, an intensive visual inspection of the deposition chamber after the deposition was carried out. In the last steps, the geometry (ovality and bow) as well as the refractive index profile of the preform was measured.

Surprisingly, none of the above-mentioned issues was observed; neither an increased number of bubbles or defects nor any discolorations or luminescence effects or higher tensions in the preform nor an instable plasma flame during the deposition process etc. occured.

The deposition rate was in the typical range for the chosen process parameters.

Hence, no stronger etching behavior of the fluorine precursor was observed. Moreover, no carbon particles in the preform or any carbon black (carbon soot) deposition in the deposition chamber was observed. This is a strong evidence, that perfluoro (2-methyl-3-pentanone) is fully cracked in the plasma flame and all carbon atoms react with the oxygen of the plasma to form CO or $CO_2$, which is extracted by the used exhaust gas system.

All things considered, the performance of the perfluoro (2-methyl-3-pentanone) precursor seems to be quite comparable to standard fluorine precursors utilized in the glass production.

The results are also illustrated in FIG. 1 which displays a refractive index profile analysis of the preform batch at the preform position 575 mm. The solid line illustrates the measured refractive index profile. The stroke line illustrates the assumed real refractive index profile and the dot line is a simulated profile, which is calculated from the graph of the stroke line based on a ray tracing method. The stroke line refractive index profile has been optimized until the profile of the stroke dot line reached the best fit to the solid line profile. In detail:

FIG. 1 represents the refractive index profile analysis of one preform section which was drawn down to an outer diameter of 25 mm.

The measurement of the real refractive index was done using a refractive index preform analyzer P104 from YORK.

The evaluation of the real refractive index profile is explained in detail in Langner et al., "Trends in specialty fiber optic materials: characterization and applications", Proc. SPIE. 11635, (2021).

It is explained in this literature, that the measured refractive index profile (solid line) illustrates typical artifacts which are caused by the measurement technique and the mathematical algorithm (Abel transformation), with which the profile is calculated from the measured signal.

These artifacts are a rounding of the edges of the preform core in the refractive index profile and an underestimation of the refractive index step between core and cladding. To overcome these artifacts, an ideal refractive index profile is assumed (graph of the stroke line) and the related simulated profile (graph of the stroke dot line) is calculated based on ray tracing and taking all artifacts into account. The assumed profile has been changed in several iteration steps and the related simulated profile have been recalculated in each case until the simulated and measured profile reached the best fit. The stroke line and related stroke dot line graphs in FIG. 1 represent the best fit.

As mentioned above, the $C_6F_{12}O$ flow has been changed during the deposition to generate a cladding with two different fluorine contents and thus two different refractive indices. And indeed, the two different cladding layers are also visible in the refractive index profile (see FIG. 1). The inner cladding layer has a refractive index difference $\Delta n$ in respect to undoped silica of $14.2 \times 10^{-3}$ which corresponds to a numerical aperture of NA 0.203 and a cladding to core diameter ratio (CCDR) of 1.041. The second refractive index layer has a Δn in respect to undoped silica of 15.6× $10^{-3}$ which corresponds to a numerical aperture of NA 0.213 and a cladding to core diameter ratio (CCDR) of 1.060. It was proven, that the $C_6F_{12}O$ flow has a significant influence on the refractive index of the deposited F-doped silica layer and thus the incorporated fluorine content in the fused silica glass. Within the chosen deposition conditions as well as precursor and gas flows, it is obvious that the higher the $C_6F_{12}O$ flow, the higher the fluorine incorporation in the glass is.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

The invention claimed is:

1. A process for the production of fluorinated quartz glass, characterized by:
   (a) generating $SiO_2$ particles in a synthesis burner;
   (b) depositing the $SiO_2$ particles resulting from process (a) on a substrate to form a body; and
   (c) vitrifying the body resulting from process (b), wherein a fluorinating agent having a boiling point of greater than or equal to −10° C. is introduced to the synthesis burner during process (a),
wherein fluorinating agent is selected from a group comprising:
   i. oxygen-containing fluorinating agents;
   ii. nitrile-containing fluorinating agents;
   iii. mixtures of the oxygen-containing and nitrile-containing fluorinating agents, characterized in that the oxygen-containing fluorinating agents are selected from the group consisting of:
   i. Perfluoroketones of the general formula (I)

$$R_{F1}-CO-R_{F2} \qquad (I),$$

wherein $R_{F1}$ is selected from the group consisting of perfluorinated carbon groups having 1 to 7 carbon atoms and fluorine; and $R_{F2}$ is selected from the group consisting of perfluorinated carbon groups having 1 to 7 carbon atoms;

ii. Perfluoroethers of the general formula (II)

$$R_{F1}-C(X_1)(X_2)O-R_{F2} \qquad (II),$$

wherein $R_{F1}$ is selected from the group consisting of perfluorinated carbon groups having 1 to 7 carbon atoms and fluorine; $R_{F2}$ is selected from the group consisting of perfluorinated carbon groups having 1 to 7 carbon atoms; and $X_1$ and $X_2$ are F or $CF_3$;

iii. Hydrofluoroethers of the general formula (III)

$$R_{F1}-C(X_1)(X_2)O-R_{F2} \qquad (II),$$

wherein $RF_1$ is selected from the group consisting of perfluorinated carbon groups having 1 to 7 carbon atoms and fluorine; $R_2$ is a non-fluorinated hydrocarbon group having from 1 to 3 carbon atoms; $X_1$ and $X_2$ stand for F or $CF_3$;
   characterized in that the fluorinating agent is supplied to the synthesis burner in liquid or gaseous form.

2. The process according to claim 1, characterized in that the nitrile-containing fluorinating agents are selected from the group consisting of
   iv. Perfluoronitriles of the general formula (IV)

$$R_{F1}-C\equiv N \qquad (IV),$$

wherein $R_{F1}$ is selected from the group consisting of a perfluorinated carbon group having 1 to 7 carbon atoms.

3. The process according to claim 1, characterized in that the synthesis burner is a flame hydrolysis synthesis burner or a plasma synthesis burner.

4. The process according to claim 1, characterized in that the deposition of $SiO_2$ particles to form a body in process (b) is carried out outside of the substrate.

5. The process according to claim 1, characterized in that the deposition of $SiO_2$ particles to form a body in process (b) takes place in a substrate tube.

6. The process according to claim 1, characterized in that the process (b) and (c) are carried out simultaneously.

7. The process according to claim 1, characterized in that the fluorinating agent is supplied in gaseous form to the synthesis burner and is previously evaporated in an evaporator, or in that the fluorinating agent is supplied in gaseous form to the synthesis burner and is previously subjected to direct evaporation, or in that the fluorinating agent is supplied in gaseous form to the synthesis burner and is previously provided in the carrier gas in a bubbler using a carrier gas.

8. The process according to claim 1, characterized in that the fluorinating agent is supplied to the synthesis burner as a liquid in atomized form or as an aerosol.

* * * * *